April 18, 1939.　　　C. F. ALLISON　　　2,154,715
BAG CLOSING MACHINE
Filed June 14, 1937　　　11 Sheets-Sheet 1
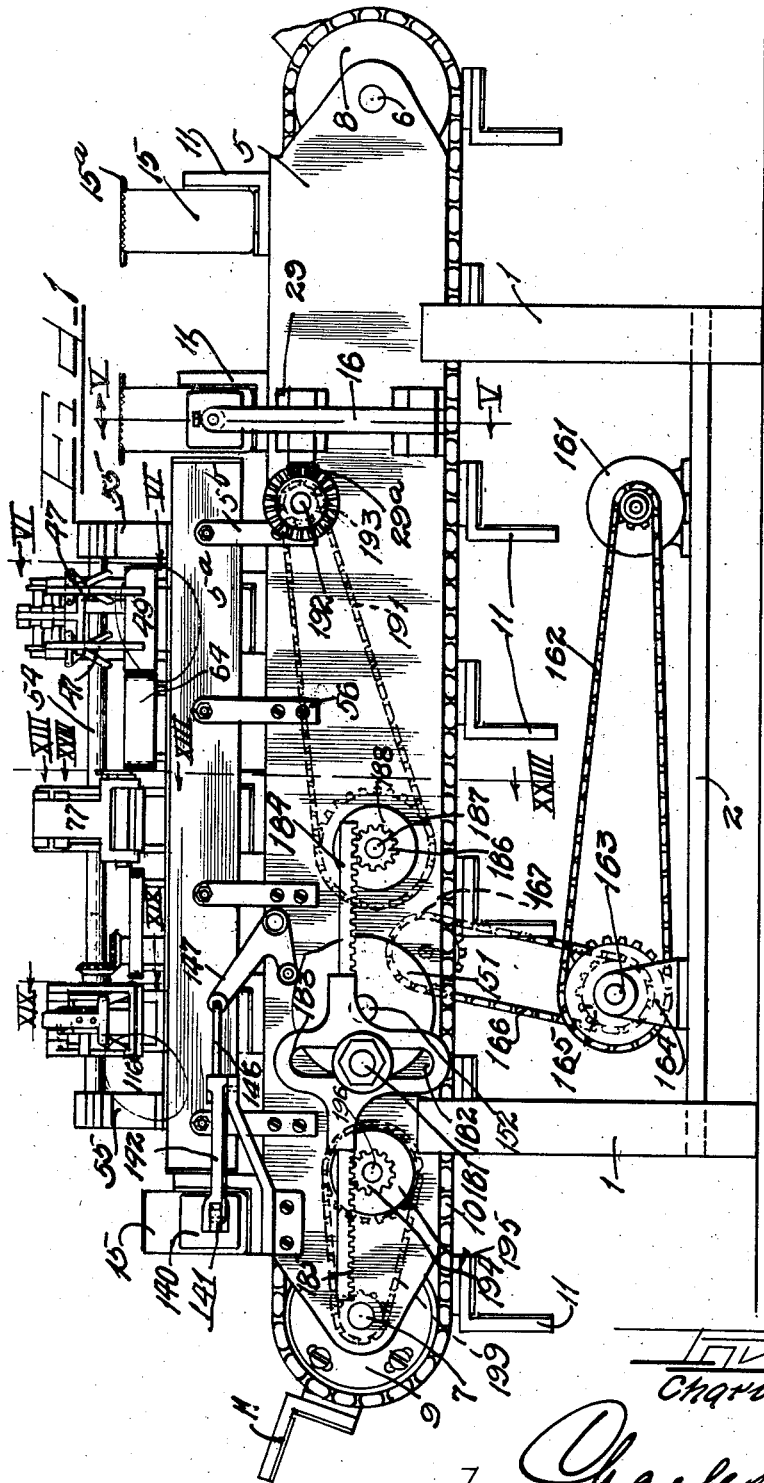
Inventor
Charles F. Allison

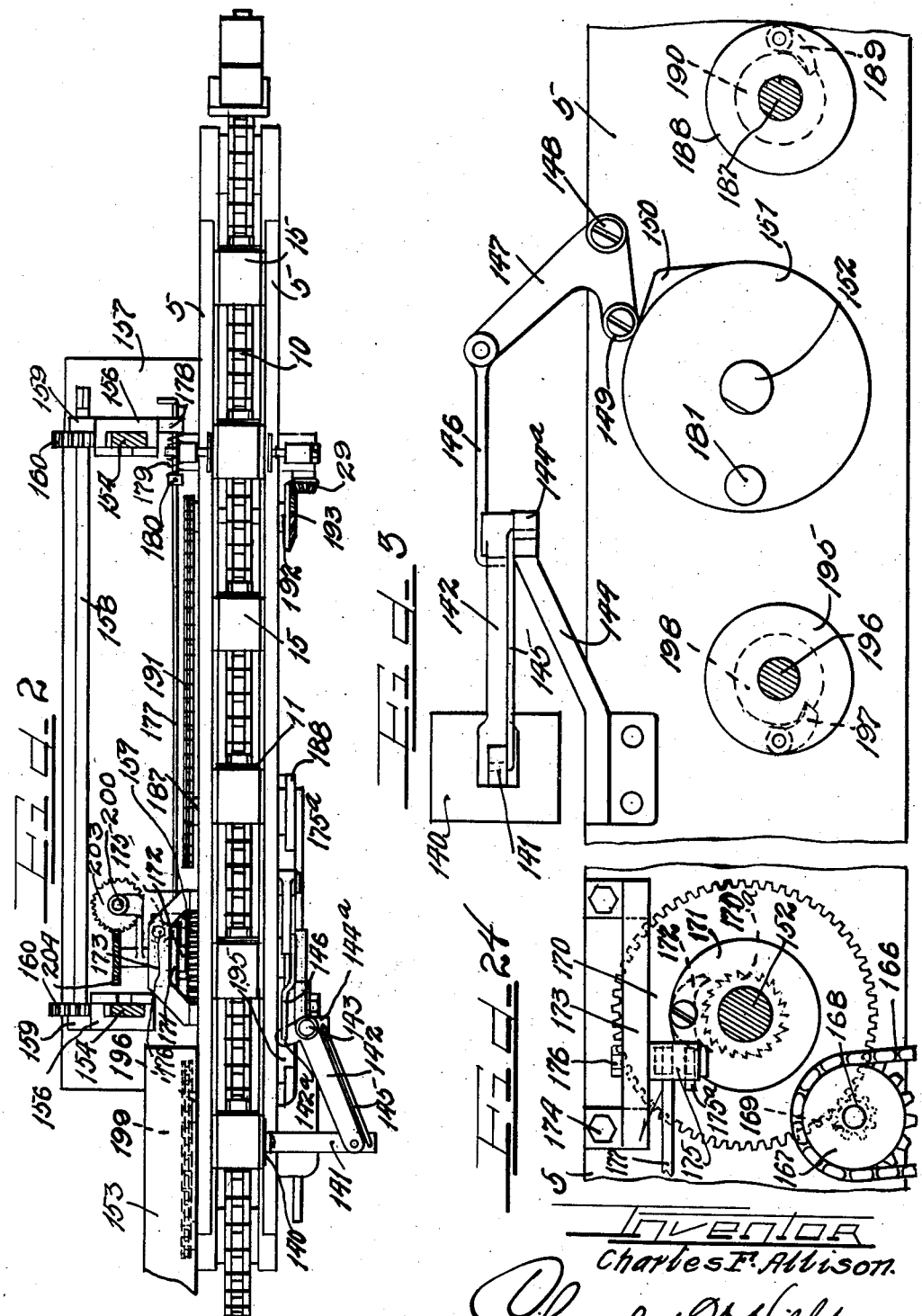

April 18, 1939. C. F. ALLISON 2,154,715
BAG CLOSING MACHINE
Filed June 14, 1937 11 Sheets-Sheet 3
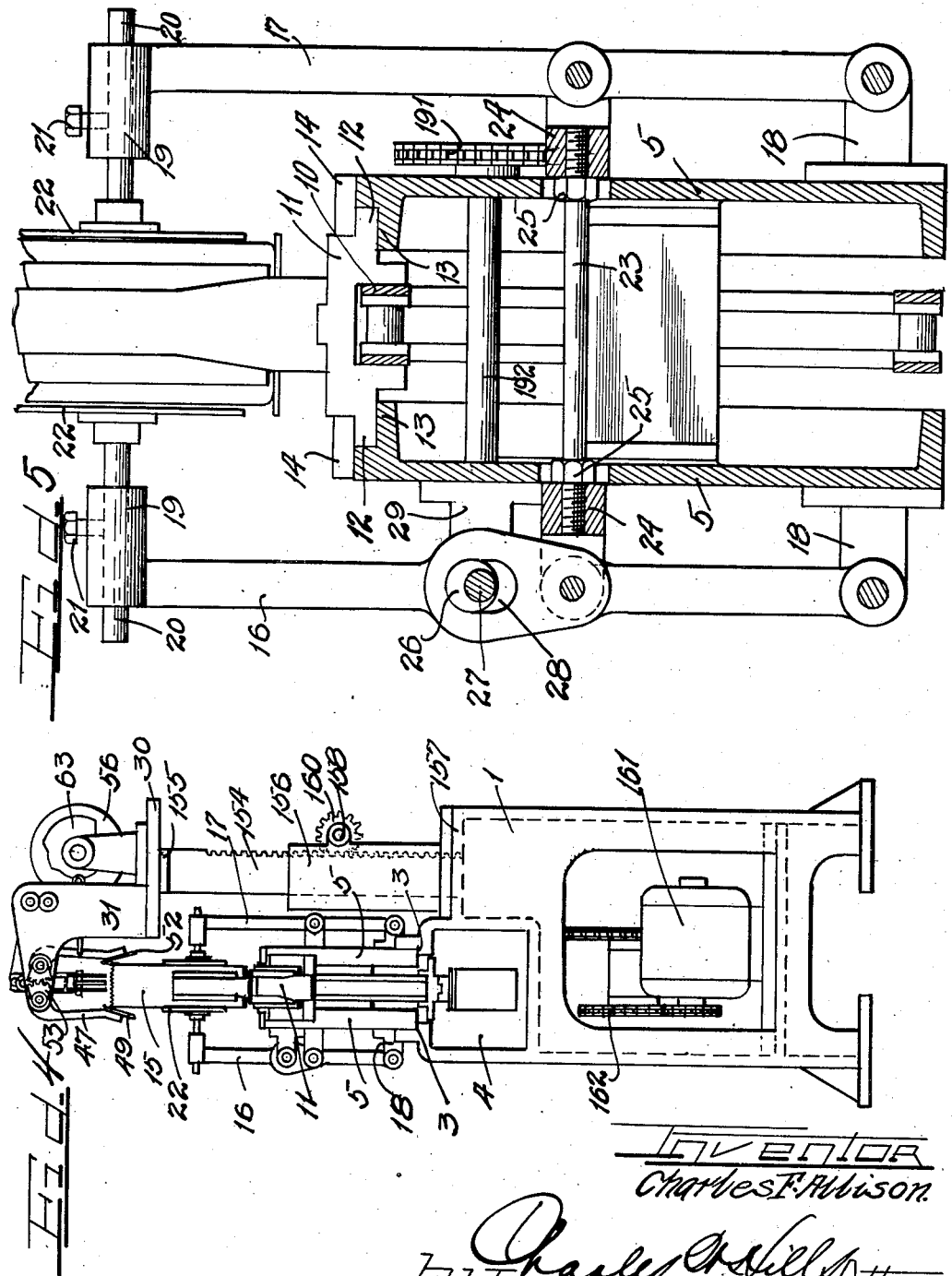

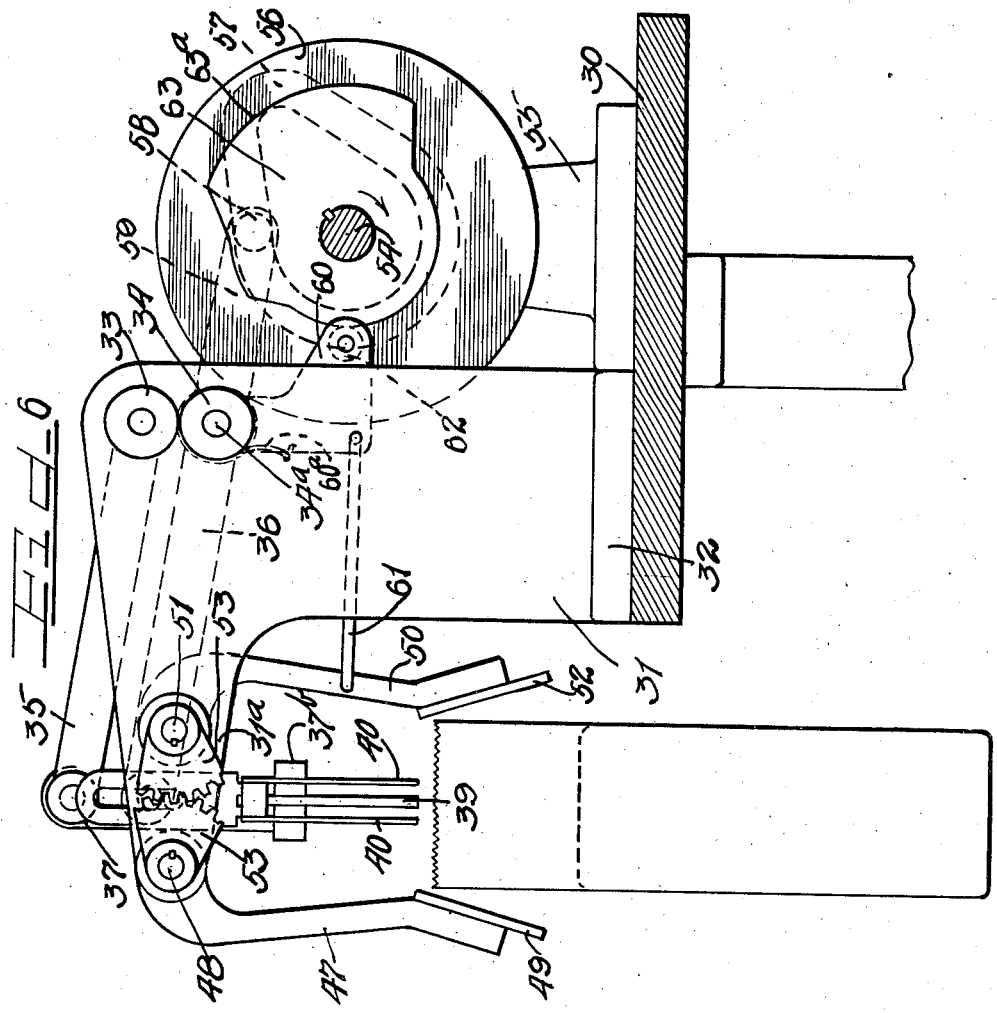

April 18, 1939. C. F. ALLISON 2,154,715
BAG CLOSING MACHINE
Filed June 14, 1937 11 Sheets-Sheet 5
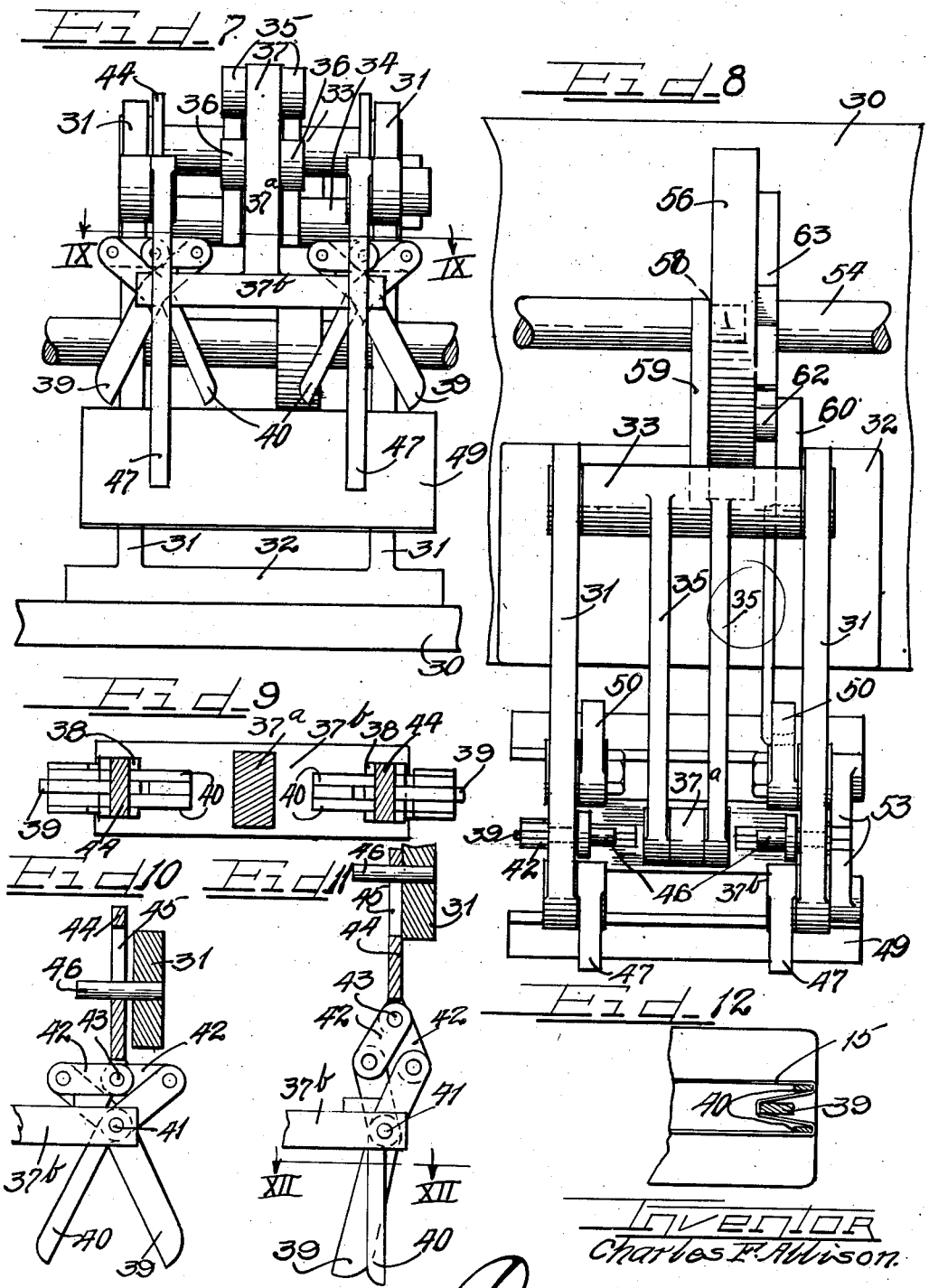

April 18, 1939.  C. F. ALLISON  2,154,715
BAG CLOSING MACHINE
Filed June 14, 1937  11 Sheets-Sheet 6
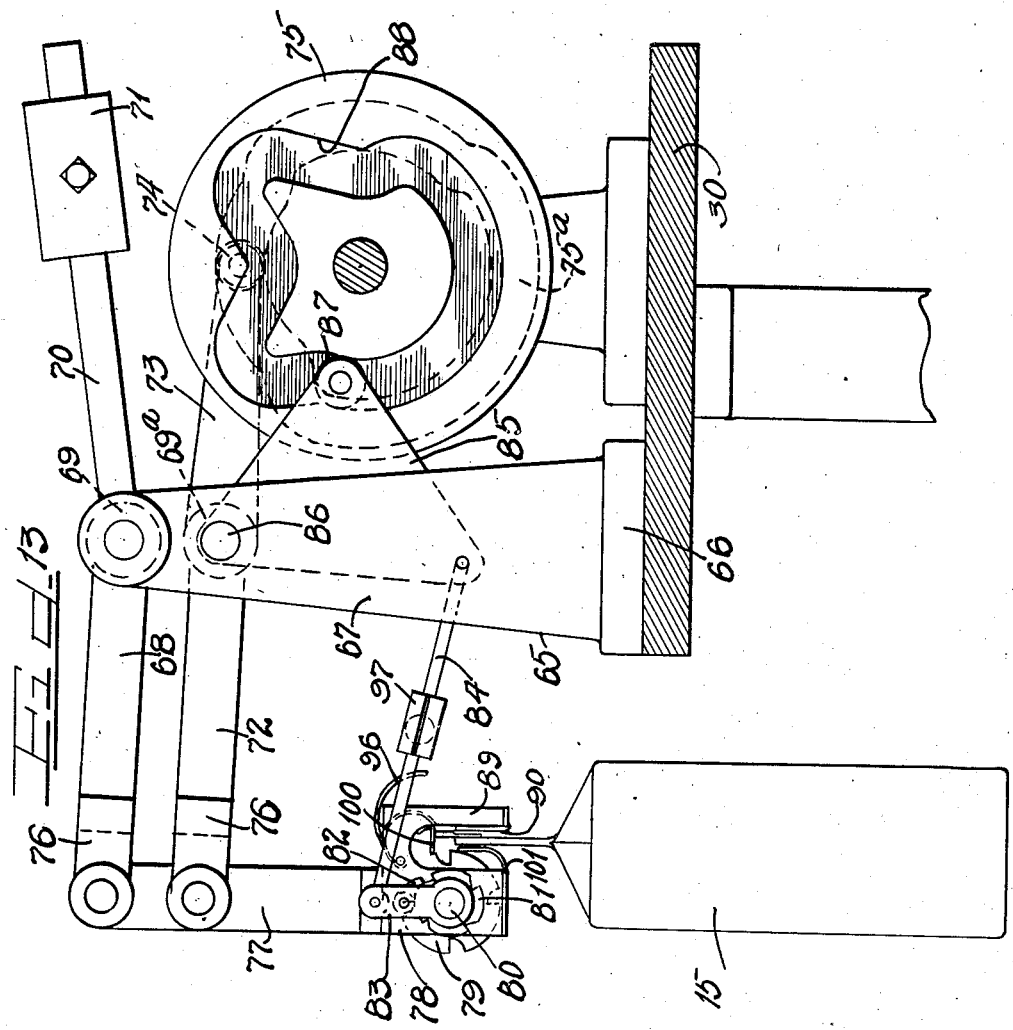
Inventor
Charles F. Allison.

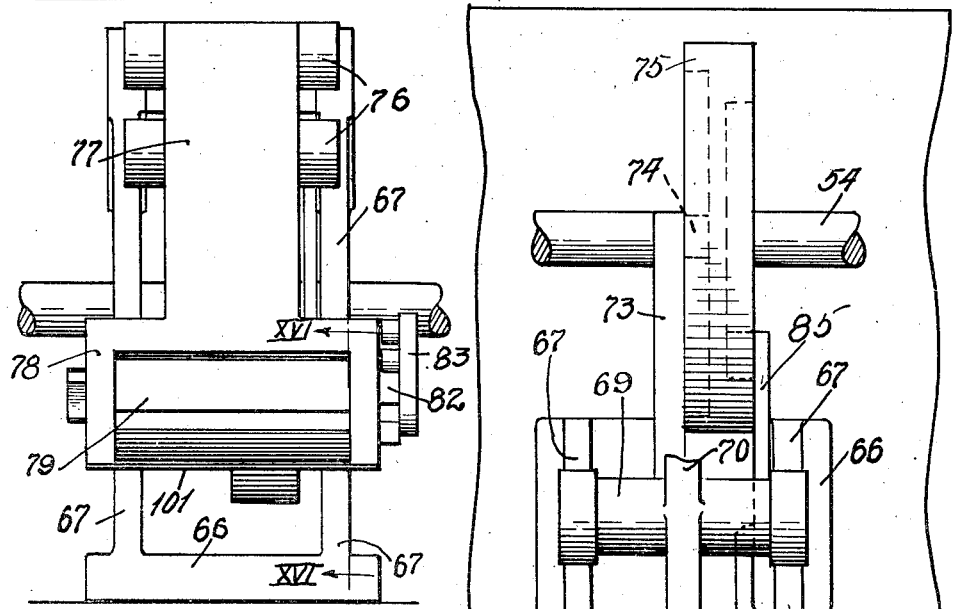

April 18, 1939.    C. F. ALLISON    2,154,715
BAG CLOSING MACHINE
Filed June 14, 1937    11 Sheets-Sheet 8
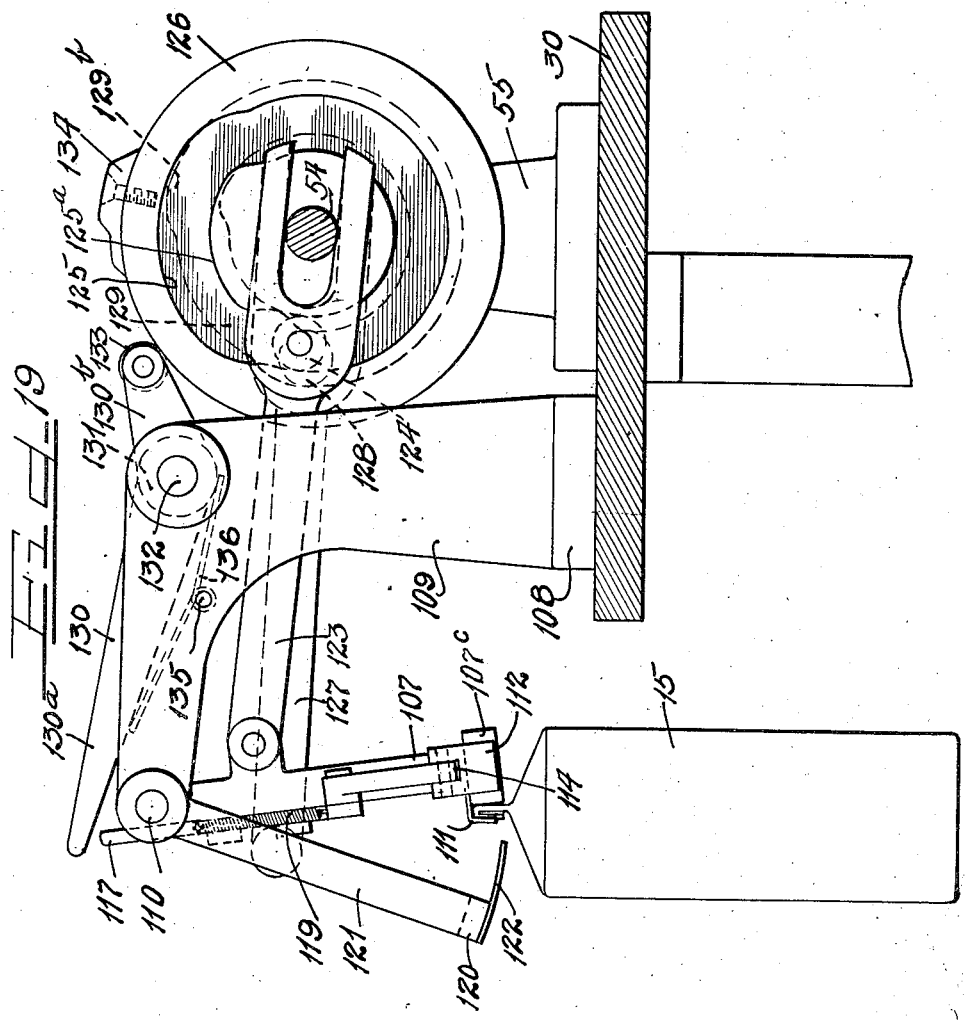
Inventor
Charles F. Allison.
by Charles H. Will
Attys.

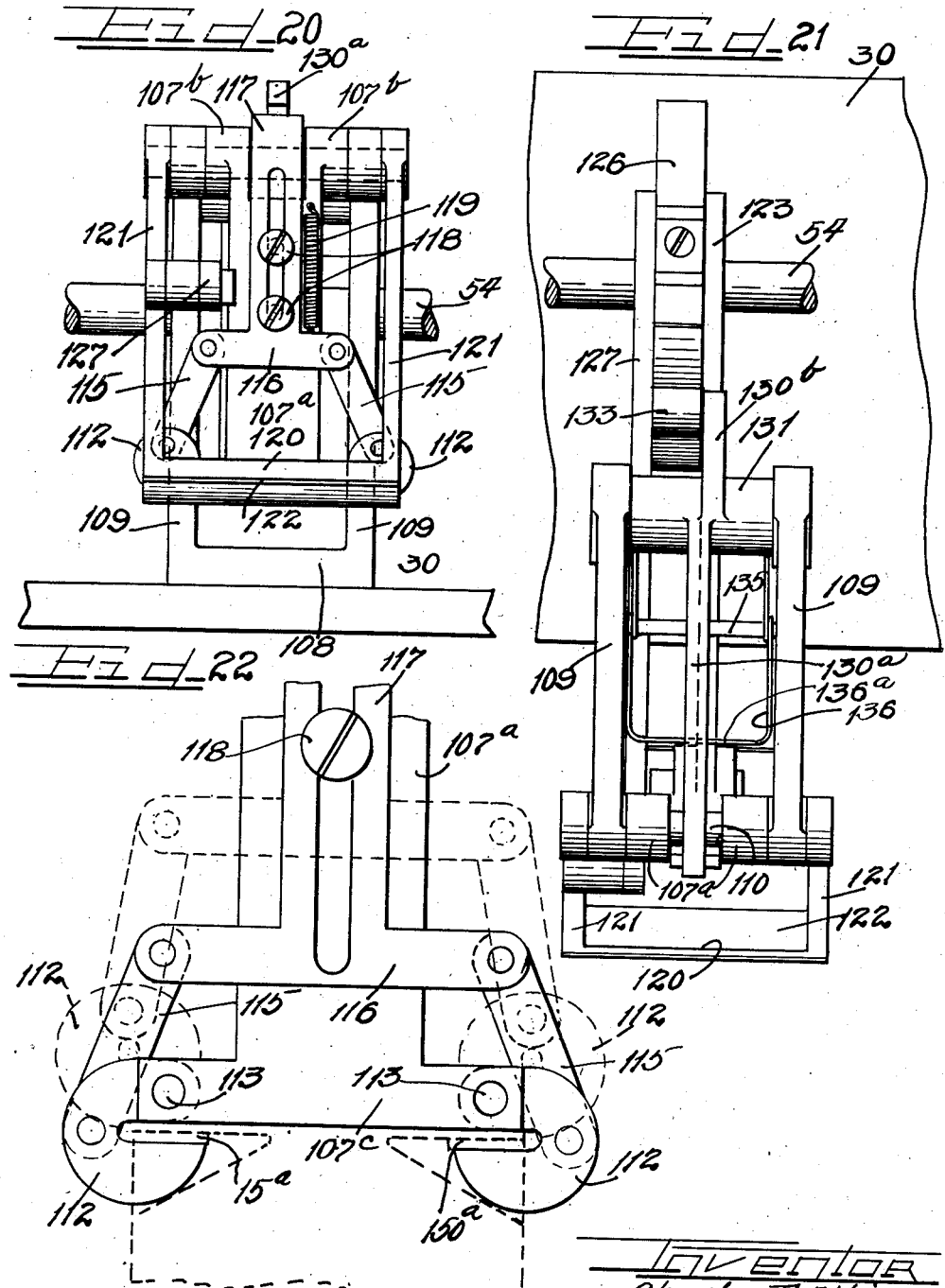

April 18, 1939.　　C. F. ALLISON　　2,154,715
BAG CLOSING MACHINE
Filed June 14, 1937　　11 Sheets-Sheet 10

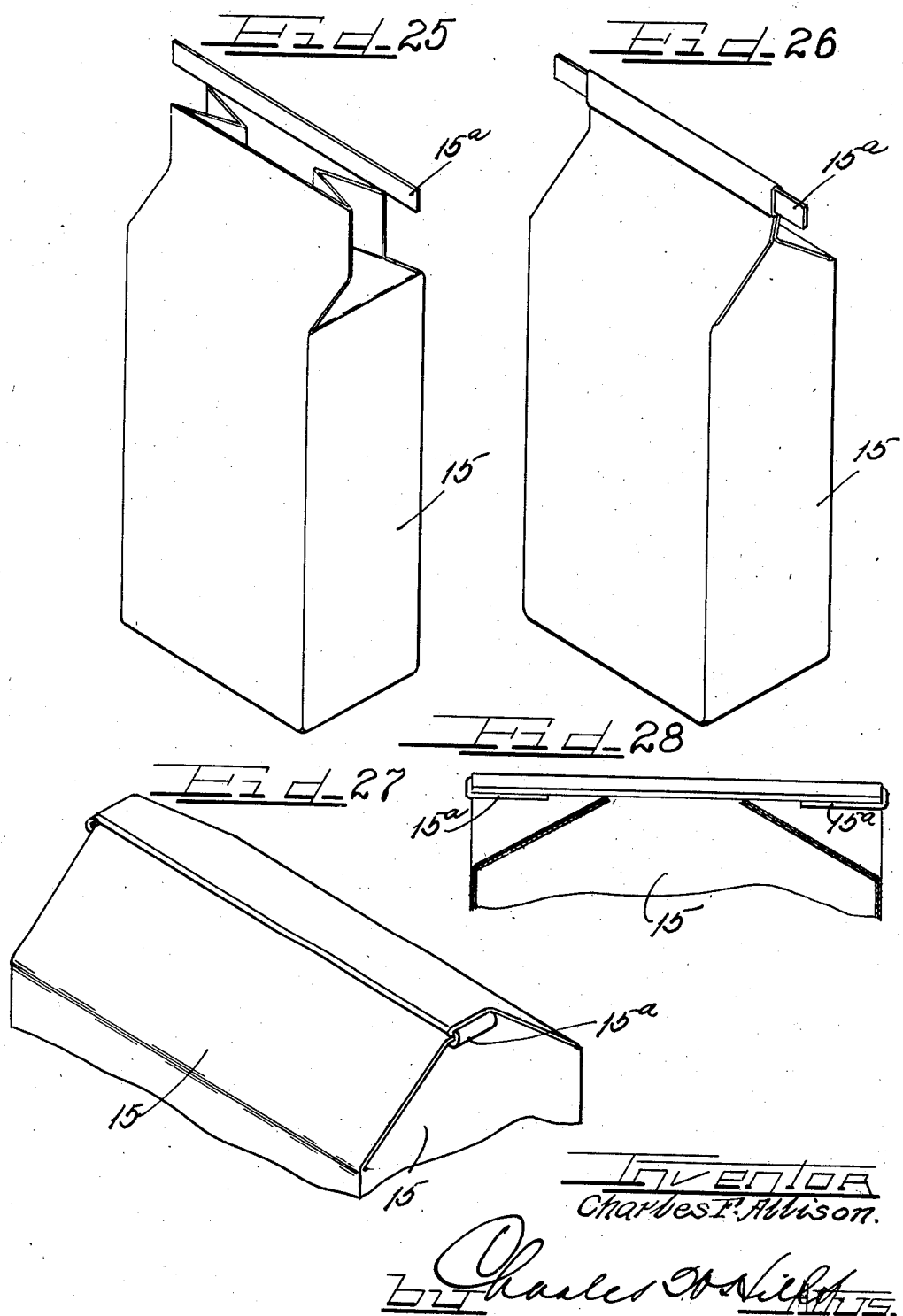

Patented Apr. 18, 1939

2,154,715

UNITED STATES PATENT OFFICE 2,154,715

BAG CLOSING MACHINE

Charles F. Allison, Chicago, Ill., assignor to Bag Closing Machine Corporation, Chicago, Ill., a corporation of Illinois Application June 14, 1937, Serial No. 148,042

24 Claims. (Cl. 93—6)

This invention relates to a bag closing machine.

It has become quite common to provide bags with metal ties attached to the neck portion for closing the bag. As a general rule, the neck portion of the bag would be folded and the ends of the tie folded or crimped about the neck portion. Thus, the folded neck portion would be secured in upstanding position. In most cases, this has been manually done.

It has been proposed to fold the neck portion of the bag and crimp the ends of the metal ties about the neck portion by machines such as is disclosed in the Joplin Patent No. 1,886,552, but such machines merely fold one portion of the neck of the bag against an adjacent neck portion and crimp the ends of the metal tie around the neck portion. These machines are incapable of folding or positioning the folded portion flat upon the top of the body of the bag and then crimping the ends of the metal tie downwardly and under a portion of the bag for anchoring the folded portion in a flat position upon the top of the bag.

It is accordingly an object of this invention to provide a novel machine having novel shaking, creasing, folding, and fold positioning mechanisms that will position the folded neck portion of a bag having a metal tie in a substantially flat position upon the top of the bag and folding the ends of the metal tie in a downward direction for engaging under portions of the bag for anchoring the folded down portion in position, whereby the closed bag will have a substantially flat top as shown in Figure 27 in contradistinction to the upstanding folded necks of bags folded by such machines as disclosed in said Joplin patent.

It is also an object of this invention to provide means for creasing or tucking in the ends of bags that may be provided with lining or "Cellophane" covers that could not be tucked in by the mechanism heretofore used.

It is also an object of this invention to provide a compact machine in which the bag conveyor travels in a vertical plane, and in which a novel folding mechanism is employed.

In accordance with this invention the filled paper bags with metal ties are first vibrated for setting the contents thereof, the ends of the unfilled or neck portions of the bags are then creased or tucked in. Thereafter the neck portions are folded and then positioned upon the top of the bag, and the ends of the metal ties are folded or crimped downwardly for engaging under portions of the bag. At a suitable point, the closed bags are ejected in a lateral direction.

The invention comprises the novel structure and combination of parts hereinafter described and more particularly pointed out and defined in the appended claims.

In the accompanying drawings which illustrate a preferred form of this invention and in which similar reference numerals refer to similar features in the different views:

Figure 1 is a side elevational view of a bag closing machine involving this invention.

Figure 2 is a top plan view of the conveyor with the upper parts of the machine removed.

Figure 3 is an enlarged fragmentary elevational view of a part of the operating mechanism.

Figure 4 is an end elevational view of the machine.

Figure 5 is an enlarged sectional view taken substantially upon the line V—V of Figure 1 looking in the direction of the arrows.

Figure 6 is an enlarged sectional view taken substantially upon the line VI—VI of Figure 1 looking in the direction of the arrows and showing the end creasing mechanism in end elevation.

Figure 7 is an enlarged and fragmentary side elevational view of the bag creasing mechanism.

Figure 8 is an enlarged fragmentary plan view showing parts of the operating means for the creasing mechanism.

Figure 9 is an enlarged sectional view taken upon the line IX—IX of Figure 7 looking in the direction of the arrows.

Figure 10 is an enlarged fragmentary side elevational view of an end creasing mechanism showing the parts in position for engaging a bag.

Figure 11 is a view similar to Figure 10 showing the parts in operative position.

Figure 12 is an enlarged sectional view taken upon the line XII—XII of Figure 11 looking in the direction of the arrows and showing also the upper edge of a bag.

Figure 13 is an enlarged sectional view taken substantially upon the line XIII—XIII of Figure 1 looking in the direction of the arrows and illustrating the bag folding mechanism in elevation.

Figure 14 is an enlarged fragmentary end elevational view of the bag folding mechanism.

Figure 15 is an enlarged fragmentary top plan view illustrating the bag folding mechanism.

Figure 16 is an enlarged sectional view taken substantially upon the line XVI—XVI of Figure 14 looking in the direction of the arrows.

Figure 17 is a view similar to Figure 16 illustrating the parts in different positions.

Figure 18 is a view similar to Figures 16 and 17 with the parts in different positions and showing the end or wall plate.

Figure 19 is an enlarged sectional view taken upon the line XIX—XIX of Figure 1 looking in the direction of the arrows and illustrating the last folding or fold positioning mechanism.

Figure 20 is an enlarged left end elevational view of Figure 19 showing the fold positioning mechanism.

Figure 21 is an enlarged top plan view of the mechanism shown in Figure 19.

Figure 22 is an enlarged fragmentary elevational view showing in diagrammatic form the manner in which the ends of the metal tie are crimped under portions of the bag.

Figure 24 is an enlarged fragmentary sectional view illustrating the intermittent drive.

Figure 25 is a perspective view of a bag after a creasing or tucking operation.

Figure 26 is a perspective view of a bag after the folding operation.

Figure 27 is a fragmentary perspective view of the top of the bag after the fold has been bent down.

Figure 28 is a fragmentary sectional view through the top of the bag.

Figure 23:
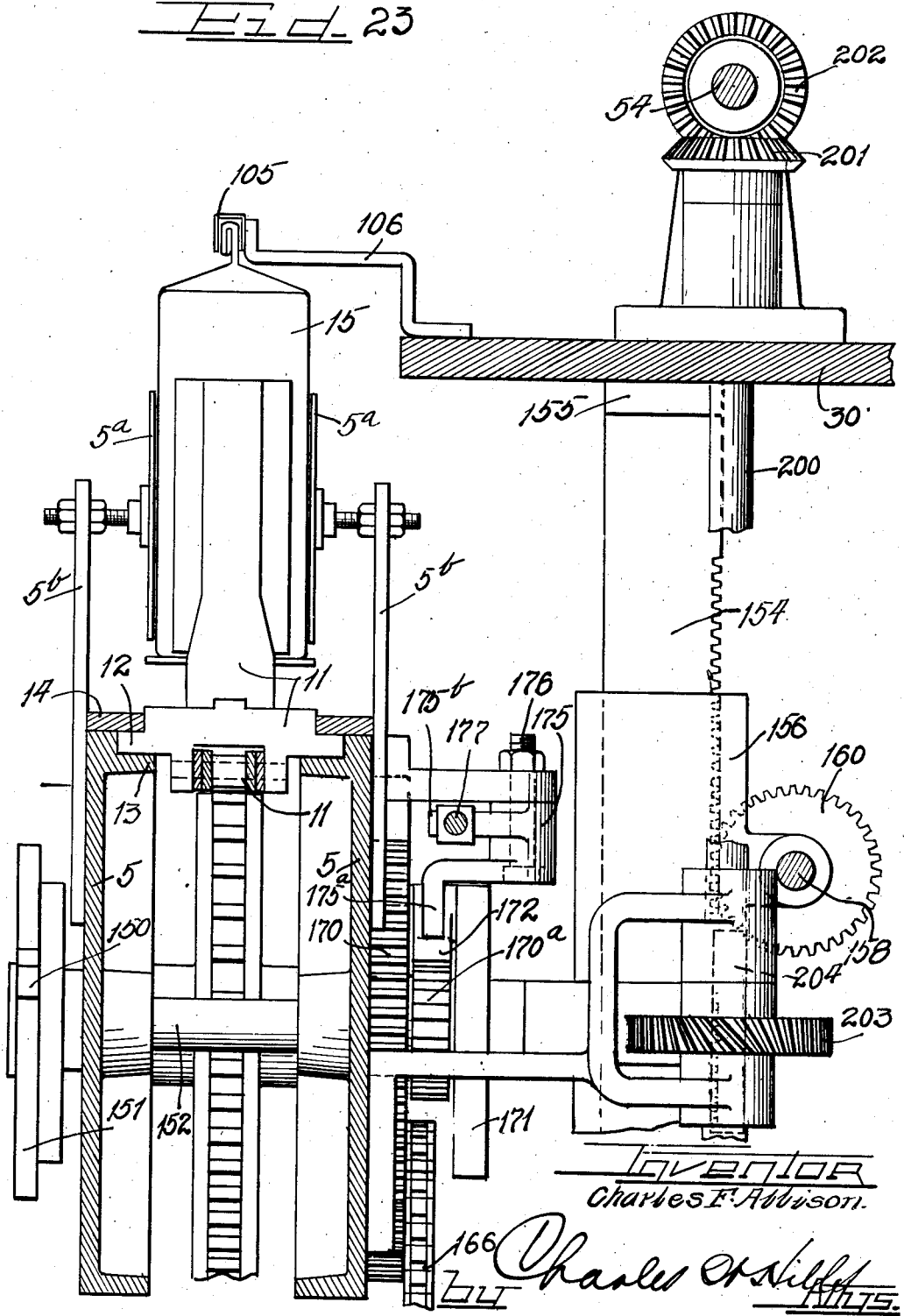
Figure 23 is an enlarged sectional view taken substantially upon line XXIII—XXIII of Figure 1.

The apparatus involving this invention comprises a settling station where the filled bags are vibrated for settling the contents thereof, a creasing or tucking in station where mechanism engages the ends of the bag for tucking in the same, a folding station where the necks of the bags are folded, and a fold positioning and anchoring station where the folded necks of the bags are folded down and positioned substantially upon the tops of the bags and the ends of the metal ties are crimped down to anchor the folded portions. Beyond the last station there is an ejecting station where the filled and closed bags are laterally ejected from the conveyor. The operating mechanism at these different stations will be described in sequence.

In the drawings there is shown the preferred form of apparatus for carrying out this invention and the particular mechanism to be described should be understood as being merely illustrative of this invention. The machine proper is preferably supported upon stanchion members 1 connected by a longitudinally extending platform 2. The upper ends of the stanchion members 1 are provided with spaced right angled seats 3 (Figure 4), and with a polygonal opening 4 therebelow for the passage of the conveyor flights.

Upon the seats 3 are supported parallel frame plates 5 which are suitably secured by various means that will later be referred to. The ends of these plates are bluntly pointed and they carry shafts 6 and 7 which in turn respectively support the tail and head sprockets 8 and 9 that are positioned between such plates. A suitable chain conveyor 10 is trained over these sprockets. This chain conveyor includes the right angled flights or bag seats 11 attached thereto. These flights 11 which are best shown in Figures 5 and 23, extend beyond the sides of the sprocket chain and terminate in guide flanges 12.

The upper inner portions of the plates 5 are provided with longitudinally extending guide flanges 13 which are spaced a short distance below the tops of the plates. Upon the tops of the plates 5 are secured guide strips 14 that overlie the flanges 12 and form with the flanges 13 suitable guide ways for the flights. Thus, the flights upon which the bags are seated are solidly supported during the different bag closing operations.

With reference to Figure 1, it will be noted that the flights 11 can readily enter the guideway due to the fact that the tail sprocket 8 extends partly beyond the end points of the plates 5 whereby the flights will assume a substantially horizontal position as they approach the guides. As soon as a flight enters the guideway, or even before, if desired, a filled bag 15 with a metal tie 15a may be positioned thereon. This will probably be done during a pause in the travel of the conveyor.

When a flight reaches the bag settling station, the conveyor will stop and mechanism will be set in operation for shaking or vibrating the filled bag upon such flight for settling the contents thereof. This shaking mechanism is best shown in Figures 1 and 5 and primarily consists of the levers 16 and 17 pivoted at their lower ends upon brackets 18 attached to the sides of the plates 5. The upper ends of these levers are in the form of cylindrical bearings 19 in which rods 20 are adjustable by means of set screws 21. These rods carry pads or plates 22 upon their adjacent ends which are adapted for alternately engaging the sides of the filled bags.

The levers 16 and 17 are connected for simultaneous swinging movements by means of a rod 23 which extends through the plates 5. The rod 23 carries a bifurcated block 24 at each end; the levers 16 and 17 being pivoted in the bifurcations. The blocks 24 are preferably threaded upon the rod and for this purpose they are provided with polygonal inner ends 25.

The means for swinging the levers 16 and 17 consists of a driven eccentric 26 upon a shaft 27 that extends through an aperture 28 in the lever 16. The shaft 26 is journalled in a bracket 29 attached to the side of a plate 5. The shaft 26 carries a bevel gear 29a (Figure 1) which is driven by the driving mechanism of the machine which will be later set forth.

It will be evident that rotation of the eccentric 26 will simultaneously swing the two levers 16 and 17 with the result that the pads 22 will alternately engage the bag and shake or vibrate the same for settling the contents thereof.

After the contents of a bag have been settled, the conveyor will advance to convey the bag through a guide way formed by the adjustable guide plates 5a supported by brackets 5b attached to the plates 5 to the creasing or tucking station where the machine will again stop. The operator will now set the machine in motion for operating the shaking mechanism for the next succeeding bag and for operating the end tuckers. The tucking mechanism is best shown in Figures 6 to 11 and will now be set forth.

Upon the rear side of the machine there is a platform 30 for supporting certain operating parts adjacent the conveyor. A pair of upstanding spaced plates 31 having an integral base 32 resting upon the platform supports the creasing or tucking in mechanism. A pair of hollow sleeve shafts 33 and 34 are journalled in these plates. A pair of arms 35 are integral with the shaft 33, while a pair of arms 36 are integral with the shaft 34. A cross head 37 is pivoted to the free ends of the arms 35 and 36.

The cross head consists of a vertical portion 37a that serves as a link and a horizontal portion 37b that carries the creasing and tucking members. The ends of the cross head portion 37b are bifurcated as indicated at 38 (Figure 9). An outer tucker blade 39 and two inner tucking blades 40 are pivoted in each bifurcation. It will be noted that each blade 39 is positioned between the tucking blades 40 and that the three blades in each bifurcation are secured by a pivot pin 41. It will further be noted that the tucking blades are pivoted intermediate their ends so that the upper portion thereof extends above the member 37b while the lower portion thereof extends below the member 37b. Above the pivot point 41, the tucking blades 39 and 40 are directed at diverging angles as shown in Figures 7 and 10, and these upper diverging ends are pivotally connected by links 42 to a pivot pin 43 carried by a link 44. Each link 44 is formed with a slot 45 for receiving a pin 46 projecting from a plate 31 (Figure 8) whereby the vertical movement of the link 44 is limited.

Arms 47 are pivoted by means of suitable pivot studs 48 to the forward ends of the plates 31 which it will be noted in Figure 6 are angular with forwardly projecting portions 31a, one arm being pivoted adjacent each plate 31. A plate 49 is secured to the lower ends of the arms 47 which it will be noted are at a slight outward angle as shown in Figure 6.

Spaced inwardly upon the plates 31 are pivoted a second pair of arms 50 by means of pivot studs 51. The arms 50 are similar to the arms 47 and support a plate 52 at their lower ends.

The pivot stud 51 of one arm 50 projects through its plate 31 and carries a gear segment 53 as shown in Figures 6 and 8. Likewise the stud 48 of the arm 47 that is adjacent the same plate 31 projects through said plate 31 and carries a gear segment 53 in meshing relation with the other gear segment 53 whereby movement of the said arm 50 will cause a similar movement of the arms 47.

The end tucking members and one of the arms 50 are operated from suitable cams in a manner which will now be set forth. A shaft 54 which is journalled in suitable bearing brackets 55 on the platform 30 has a cam 56 keyed thereon. This cam has a suitable groove 57 in which a roll or stud 58 moves. This stud 58 is secured to an arm 59 which is integral with or secured to the sleeve shaft 34. Rotation of said cam will rock the sleeve shaft 34 and raise and lower the arms 36 and 35 which define a parallel motion and to which the creasing members 39 and 40 are connected.

A bell crank lever 60 is secured to a rod or shaft 34a passing through the sleeve shaft 34, the sleeve 34 being cut away for such a purpose. The lever is connected to the opposite arm 50 by a link 61. The bell crank lever also carries a roller 62 that engages a cam 63 secured upon the shaft 54 adjacent the cam 56. Operation of the bell crank by the cam 63 will swing the arms 47 and 50 toward each other. The bell crank is returned through a spring 60a.

In the position of the parts shown in Figure 6, the cam 56 is beginning to lower the tucking mechanism into a bag. By the time this mechanism has been lowered, the cam 63 will begin moving the arms 47 and 50 together. While the end tucking mechanism is rising, the cam 63 will be moving the arms 47 and 50 closer together until the high arc 63a of cam 63 is reached when the plates 49 and 52 will have partially collapsed the neck of the bag for maintaining the creases and folds. As the high arc of cam 63 is of considerable extent, the bag will be maintained in its partially collapsed position for a fair period.

As the end tucking mechanism is lowered, the blades 40 will enter the bag while the blades 39 will move down adjacent the outer surface of the bag. The two sets of tucking members are so spaced as to engage the end portions of a bag. As the tucking mechanism is being lowered, the parts are substantially in the positions shown in Figures 7 and 10 so that the tucking blades will straddle the end walls of the bag. However, when the tucking mechanism has been lowered sufficiently to bring the upper ends of the slots 45 in the links 44 against the pins 46 as shown in Figure 11, the tucking blades will begin to come together. For further downward movement of the cross head 37 from this point will cause pivot points 41 to move further downward while pivot points 43 remain stationary with the result that the blades will partake of a toggle action and move to the positions shown in Figure 11 for tucking in and creasing the end walls of the bag as shown in Figure 25.

With reference to Figure 1, it will be noted that the plates 49 and 52 that partially collapse the neck of the creased bag are longer than the bag and extend to guide plates 64. The high arc of cam 63 is designed to maintain the plates 49 and 52 in their operative positions until the creased neck of the bag has been advanced to the guide between the plates 64. After the tucking operation is completed, the conveyor will be operated for advancing the bag to the folding station and then stop. The operator will now start the machine again for operating the parts including the folding mechanism which is best shown in Figures 13 to 18 to which reference will now be made.

Upon the platform 30 there is a stanchion 65 consisting of a base 66 and a pair of spaced uprights 67. An arm 68 provided with an elongated hub 69 is journaled between the upper ends of the uprights 67. A counterweight arm 70 with an adjustable counterweight 71 thereon extends from the hub 69 in a direction opposite to the arm 68 which constitutes a parallel motion arm.

Below the arm 68, there is a second arm 72 which has a hub 69a journalled between the uprights 67. An arm 73 integral with the hub 69a extends alongside of a cam 75 where it is provided with a roller 74 operating in a groove in such cam.

The forward ends of the arms 68 and 72 carry bifurcations 76 in which is pivoted a hanger 77 in any suitable manner. The lower end of the hanger 77 is in the form of a bifurcation 78 in which is mounted a notched cylinder 79 secured upon a shaft 80 which extends beyond one side of the bifurcation for supporting rigidly thereon a ratchet wheel 81 adapted to be engaged by a pawl 82 pivoted upon a lever 83 loosely journalled upon the end of the shaft 80.

The lever 83 is connected by means of a link 84 to an apex of a triangular plate 85 which acts as a bell crank lever. Another apex of said lever 85 is journalled upon a shaft 86 which supports the hub 69a which is cut away for this purpose as shown in dotted lines in Figure 15. The third apex of this lever carries a roller 87 which operates in a cam groove 88 in the cam 75.

The bifurcation 78 on the hanger 77 has lateral wings 89 which extend rearwardly and which are provided with upwardly extending U-shaped grooves or slots 90 adapted for receiving the tucked neck of a bag with a metal tie 15a thereon. A rod 91 extends between the wings 89. A substantially L-shaped folding member 92 in the form of an L-shaped bent plate has a hub portion coiled around the rod. This hub portion is cut away at an intermediate point for a coil spring 93 which surrounds the rod with one end 94 abutting the bottom of the hanger 77 and the other end 95 engaging under the plate 92. The tendency of the spring 93 is to hold the plate in the position shown in Figure 17. A bracket 96 is secured or welded to the plate 92 adjacent the link 84. This bracket is angular so that its operative portion is spaced from the plate 92. This bracket 96 is in the path of movement of an abutment 97 secured upon the link 84 with the result that when the link 84 moves forwardly the folding plate 92 will be actuated against the tension of the spring 93 to fold the end of the bag over.

Spaced from the bracket 96 there is a second bracket 96a (Figure 15). A bar 98 is attached to the underside of these brackets, and supports a curved fold holder 99 in a position adjacent the end of the fold for engaging the metal tie as will later appear.

A stop plate 100 provided with an attaching flange is secured to the wings 89 within the slot and serves as a stop for the top of the bag as shown in Figure 13 when the hanger is lowered.

A plate 101 is attached to the bottom of the bifurcation and this plate curves upwardly and extends into the slot 90 a suitable distance in slightly spaced relation to the cylinder 79. The upper edge of this plate forms a part of the folding mechanism in that it serves to support the turned over neck portion of the bag during the rotation of the cylinder 79. The cylinder 79 is provided with a plurality of notches 102 each of which has a straight wall 103 and a curved wall 104. In the present instance four equally spaced notches are shown and the straight wall of each notch is ahead of the curved wall during rotation of the cylinder which is in a clockwise direction as viewed in Figures 16, 17, and 18.

During the operation of folding the neck of the bag, the hanger 77 descends through the operation of the cam 75 until the plate 100 comes into contact with the top of the neck of the bag as shown in Figure 13. At about this time, the lever 85 is caused to swing to the right by the cam 75 for causing the abutment 97 on rod 84 to strike bracket 96 for swinging folding plate 92 from the position shown in Figures 13 and 17 to the position shown in Figure 16. This movement of the folding plate 92 will bend the upper neck portion of the bag into a notch 102 in the cylinder which will be in proper position.

When the rod 84 moves to the left, and swings the pawl lever 83, the pawl 82 rides freely over the ratchet. However, when the link 84 is retracted by the lever 85 and cam 75, the pawl 82 will engage the ratchet wheel 81 and rotate the cylinder 79 in a clockwise direction about 90° from the position shown in Figure 16 to a point below the position shown in Figure 17. During this rotation, the bent top of the bag in the notch 102 will be folded down over the plate 101 and occupy a position between the cylinder and plate as shown in Figure 17 which illustrates the fold as it has emerged from the notch during the rotation of the cylinder which will, however, continue its rotation until it has completed 90° and brought the next notch in the wheel into proper position, which is such a position as shown in Figure 13. The folding member 92 will hold the edge of the bag in the notch until the cylinder has rotated sufficiently to start the fold.

The rotation of cam 75 will now lower the hanger 77 again until the right hand notch is again opposite the folded portion of the bag. When the hanger has been thuswise lowered, the rod 84 will be actuated again to the left for striking the bracket 96 and moving the folding member 92 against the folded portion of the bag and inserting such folded portion in the adjacent notch.

During the first folding operation, the metal tie is merely folded down against the adjacent neck portion of the bag. The second folding operation is designed to make a second fold by folding the already folded portion against the adjacent neck portion of the bag. In making this second fold, the metal tie is apt to move out and down and not be wrapped within the fold. To prevent this, the lug 99 on the strip 98 has been provided. When the second fold is being made, the lug 99 will be projected under a projecting end of the metal tie and frictionally hold the same while the cylinder 79 rotates sufficiently to start the fold. The parts are so arranged that the cylinder will have started to rotate before the bracket 96 is sufficiently released to allow spring 93 to retract the parts. Of course, as soon as the second fold is adequately started, there is no danger of the metal tie moving out and down, and it will serve as a fulcrum for making the second fold.

During the operation of making the second fold, the cylinder will be rotated 90° as for the first fold and the completed folded portion will be held between the cylinder and plate 101 just as in the case of the single or first fold. When the abutment 97 has been withdrawn sufficiently, the spring 93 will withdraw the folding member 92. The hanger, however, will remain in its lowered position for a period and hold the fold on the bag until the conveyor advances the bag. For it will be noted that the groove in which roller 74 travels has a comparatively long arc 75a that must pass the roller 74 before the hanger 77 is elevated. After a bag is completely folded as shown in Figure 26, the conveyor will advance the bag from the folding mechanism to the fold positioning and fold anchoring mechanism. As the bag leaves the folding mechanism, the folded neck will pass into a U-shaped guide 105 (Figure 23) that is supported on a bracket 106 secured to the platform 39. The conveyor will stop at the fold positioning station. The operator will then start the machine again and the fold will be properly positioned upon the top of the bag, and the ends of the metal tie will be folded down and under a portion of the bag.

As the folded neck of the bag leaves the U-shaped guide 105, it will pass into a guideway on a hanger 107 (Figures 19 to 22). The hanger 107 is pivotally supported at its upper end upon a stanchion comprising a base 108 and two spaced angular uprights 109 which it will be noted project over the bag guideway. The hanger 107 comprises a pendant plate 107a which is bifurcated at its upper end. The bifurcated portions are in the form of bearings 107b through which a shaft 110 extends.

The pendant plate 107a terminates at its lower end in a substantially horizontally extending block 107c which may be integral therewith or secured thereto. An L-shaped plate 111 is secured to the top of the block 107c and hangs over the outer side thereof in spaced relation therewith to form the aforementioned guideway for receiving the fold on the bag.

Upon each end of block 107c is pivoted an arcuate tucker 112 which is preferably in the form of a stiff metal band curved into a partial circle. One end of each tucker is curled to form a bearing for receiving its pivot pin 113. Each tucker is provided at an intermediate point with a cut out portion 114 best shown in Figure 19. In each cut out portion there is pivoted the lower end of a link 115. The upper ends of the links 115 are pivoted to a cross head 116 having a substantially vertically extending slotted bar 117. Screws 118 extend through the slot of the bar 117 and into the hanger for securing the cross head for reciprocating motion. A coil spring 119 connects the cross head with the hanger for moving or reciprocating the same in an upward direction.

A pendant frame comprising a bottom cross member 120 and side members 121 pivoted to the ends of shaft 110 is provided for a purpose that will later appear. Upon the bottom of the cross member 120 there is secured a slightly curved plate 122 which extends to one side of the frame in the direction of the hanger 107.

The hanger 107 has a pitman 123 pivotally connected to an intermediate point thereof. This pitman has a slotted rear end straddling the shaft 54 for supporting the same. Adjacent the inner end of the slot in the pitman 123, there is pivoted a roller 124 that travels in a cam groove 125 formed in the near side face of a cam 126 secured upon the shaft 54.

A pitman 127 is pivoted at one end to one of the sides 121 of the pendant frame. The other end of the pitman 127 is slotted and straddles the shaft 54 just as the pitman 123. The pitman 127 carries a roller 128 that is located in a cam groove 129 in the far side of cam 126.

Above the pitman, there is a lever 130 provided with an intermediate hub 131 journalled upon a shaft 132 secured in the uprights 109. This lever consists of a long arm 130a that extends over the upper end of the cross head bar 117 and a short arm 130b that carries a roller 133 resting upon the periphery of the cam 126 which is provided with a peripheral hump 134 for engaging the roller 133 for actuating the lever upon shaft 132 as a fulcrum. The arms 130a and 130b extend from the hub 131 as clearly shown in Figure 21.

Beneath the lever 130, there is a rod 135 that extends between the uprights 109. A spring 136 is supported upon the rod for acting upon the forward end of the lever 130 for elevating the same and maintaining the roller 133 against the cam. It will be noted that this spring is U-shaped with its arms coiled about the rod 135 and its free ends extending under the hub 131. The bridging portion 136a between the arms bears upwardly against the arm 130a of the lever 130.

The operation of the fold positioning mechanism and the metal tie tucking mechanism just described is as follows: When a bag is moved into the guideway of the hanger 107 as shown in Figure 19, the parts are in the positions as shown. As the cam 126 rotates from its position, the pitman 127 will swing the pendant frame toward the bag and cause the forward edge of the plate 122 to engage the neck of the bag just beneath the fold and form a fulcrum. At this point, the cam 126 will actuate the pitman 123 for swinging the hanger 107 to the left thereby turning the fold on the neck of the bag over the edge of the plate 122 as a fulcrum. As the hanger 107 is thuswise swung to the left, the fold will gradually slip out of the guideway until it assumes a substantially horizontal position upon the bag. During such movement of the hanger 107, the block 107c on the bottom of the hanger that moves with the hanger will gradually move over the fold as such fold is bent down, so that when the fold is completely bent down, it will be held in such position by the block 107c superimposed thereover. At this time, the arc 125a of cam 126 will be in engagement with the roller 124 on the pitman 123 so the hanger 107 will remain in its superimposed position as long as the arc 125a is in contact with the roller 124.

While the arc 125a is in engagement with its roller 124, the hump 134 will engage the roller 133 on lever 130 and elevate arm 130b and lower arm 130a of lever 130. As the arm 130a is lowered, it will strike the upper end of the cross head rod 117 and force the cross head 116 downwardly as shown in Figure 22. This downward movement of the cross head 116 will cause the arcuate tuckers 112 to rotate upon their pivots 113 with the result that the free ends of the tuckers will strike the ends of the metal tie and bend the same downwardly and inwardly under the portions of the bag beneath the fold and thuswise anchor the fold to the bag against rising or unfolding as shown in Figures 27 and 28.

After the tucking operation has been completed, the arc 129b in cam groove 129 of cam 126 will engage the roller 128 and swing the pendant frame 121 to its inoperative position and when the arc 125 leaves roller 124, the hanger 107 will swing to its inoperative position by the cam.

After the fold positioning and anchoring operation is complete, the conveyor will advance the closed bag to an ejecting station at the ends of the guides 5a as shown in Figures 1 to 3, when the machine will stop again and must again be set in operation. This ejecting mechanism consists of a plate 140 secured to an arm 141 which is pivoted to one end of a lever 142. The other end of the lever 142 is pivoted upon a stud 143 carried by a bracket 144 secured to one of the plates 5. The bracket 144 has a lug 144a, and a wire rod 145 connects the bracket with the arm 141. The lever 142 has an arm 142a adjacent the stud 143. A link 146 connects the arm 142a with one arm of a bell crank lever 147 pivoted to a frame member 5 as indicated at 148. The other arm of the bell crank lever 147 is provided with a roller 149 in the path of a V-shaped projection 150 on a cam 151 secured upon a shaft 152 journalled in the frame member 5.

The actuation of the lever 147 by the cam 151 will exert a pull upon the link 146 that in turn will swing the lever 142 toward the bag and move the ejector 140—141 for ejecting the bag from the conveyor to a receiving platform 153.

The platform 30 which supports the various devices for folding and closing the bags is preferably supported so that it can be readily raised or lowered to accommodate bags of different height. To this end, a pair of rack bars 154 (Figures 2, 4, and 23) with flanges 155 at their upper end form adjustable supports for the platform 30. These rack bars 154 extend into vertical sleeves or guides 156 supported upon a platform 157 supported upon the end frame members of the machine (Figure 2). A shaft 158 is journalled in suitable supports 159 upon the platform 157.

Gears 160 are secured upon this shaft and extend through suitable apertures in the guides 156 for meshing with the rack bars. By rotating the shaft 158, the platform 30 may be raised or lowered.

The driving mechanism for the different parts of the machine which will now be described is best shown in Figures 1, 2, 3, and 23. A motor 161 is mounted upon the platform 2 and is connected by means of sprocket gearing 162 to a shaft 163 journalled in suitable brackets 164 upon the platform 2. A sprocket gear 165 is secured upon the shaft 163 and a sprocket chain 166 is trained over the sprocket 165 and over a sprocket gear 167 secured upon a shaft 168 (Figure 24) supported by the frame member 5. Upon the shaft 168 there is a small gear 169 that meshes with a gear 170 loosely mounted upon shaft 152.

A ratchet wheel 170a which is also loose upon the shaft 152 is integral with or secured to the gear. A disk 171 is secured or keyed upon the shaft 152 adjacent the ratchet and this disk carries a spring pressed pawl 172 adapted to periodically form a driving connection between the gear 170 and shaft 152.

The pawl 172 is manually controlled and is adapted to remain in engagement with the ratchet 170a for one revolution of the shaft 152 which is designed to operate the conveyor 10 for moving a bag from one station to the next station and then operating the other parts as will presently appear. Upon the far frame member 5 there is secured a bracket 173 that is secured to a member 5 by bolts 174 (Figure 24). With reference to Figure 2, it will be noted that the body of the bracket is spaced from the member 5. A pawl controller 175 is pivoted upon the body of the bracket 173 by means of a pivot stud 176. This pawl controller comprises an arm 175a that is adapted to be swung or rotated into the path of the tail of the pawl 172 for throwing the pawl out of engagement with the ratchet wheel. A rod 177 is connected to an arm 175b of the pawl controller. The forward end of this rod may be suitably supported for sliding movement by means of an apertured bracket 178 (Figure 2) which may be secured to a part of the machine such as a guide 156. A spring 179 between the bracket and a collar 180 on the rod may be used for projecting the pawl controller into the path of the pawl when the rod 177 is released by the operator.

Thus the operation of the machine is under the control of the operator. To operate the machine, the operator will merely pull the rod 177 for releasing the pawl 172 whereby the shaft 152 will rotate one revolution. As soon as the rod 177 is released, the spring 179 will automatically return the same for projecting the arm 175a in the path of the tail of the pawl 172 to throw the pawl out of engagement with the ratchet wheel 170a after one revolution.

It will be noted that the cam disk 151 is secured upon the shaft 152 with the result when the shaft 152 is rotated one revolution, the cam disk 151 will likewise be given one revolution. A wrist pin 181 upon the cam disk 151 extends through a slot 182 in a yoke 183 which supports the oppositely extending rack bars 184 and 185.

The rack bar 184 engages a pinion 186 (Figure 1) loose upon shaft 187. A disk 188 which is attached to the pinion 186 is also loose upon the shaft 187. The disk 188 has a pawl 189 (Figure 3) pivoted thereto that engages a one-tooth ratchet wheel 190 secured upon the shaft 187.

When the yoke 183 is moving to the right, the pawl 189 will engage the ratchet 190 and rotate shaft 187. However, when the yoke is moving in the opposite direction, the pawl 189 will freely ride over the ratchet.

The shaft 187 is connected by sprocket gearing 191 to shaft 192 which extends through the members 5 and carries a bevel gear 193 in meshing relation with bevel gear 29a for operating the shaking mechanism.

The rack bar 185 on the yoke meshes with a pinion 194 integral with a disk 195 both of which are loosely mounted upon a shaft 196. The disk 195 carries a pawl 197 that engages a one-tooth ratchet wheel 198 rigidly secured upon shaft 196. When the yoke is moving to the left, the pawl 197 will engage the ratchet 198 and rotate shaft 196. However, when the yoke is moving to the right, the pawl 197 will ride idly over its ratchet wheel.

The shaft 196 is geared by sprocket gearing 199 to shaft 7 that supports the head sprocket 9 and the conveyor will be advanced one step when yoke 183 makes its return movement after the shaking and other operations have been completed and the parts are being restored.

The upper shaft 54 is driven by a vertical shaft 200 (Figure 23) which is suitably journalled in the machine and rigidly carries a bevel gear 201 at its upper end that meshes with a bevel gear 202 fast upon shaft 54. The lower end of shaft 200 has a spiral gear 203 fast thereon that meshes with a spiral gear 204 upon the shaft 152.

With the parts as shown in Figures 1 and 24, the pawl 172 must be released to set shaft 152 in operation. As shaft 152 starts to operate, yoke 183 will move to the right for actuating the shaking mechanism. At the same time, rotation of shaft 152 will rotate vertical shaft 200 for operating shaft 54 and the different cams thereon. The operation of the cams will actuate the tuckers, folders, and fold-positioning members while the yoke 183 is moving to the right. When the yoke 183 turns in its course and moves to the left, the tuckers, folders, and fold-positioning members will be moving to inoperative positions and the conveyor will be operated one step to advance the bags from one station to the next. During each rotation of cam 151 the ejecting mechanism will be operated for ejecting a bag. Thus, one cycle of shaft 152 will be the extent of operation at a time since the pawl 172 will automatically disconnect the shaft 152 after each cycle of operation.

This feature of starting the machine, after each cycle of operation allows the attendant ample time to place a bag upon the conveyor and see that it is in proper shape and properly positioned.

It will be appreciated that the machine is very compact and occupies but little space and is always under control of the attendant so that the work it is designed to do can be properly performed. At the same time it will be apparent that the feature of folding the folded portion of the bag substantially flat upon the top of the bag and anchoring the same in position produces a more satisfactory package than has been heretofore possible.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. In a bag closing machine, means for settling the contents of a bag, means for tucking in the ends of the neck of the bag, means for folding the neck portion of the bag, means for positioning the folded portion in flatwise position upon the top of the bag, said folded portion carrying a metal tie and simultaneously operable curved elements for folding down and tucking in the ends of the metal tie beneath the fold for the purpose set forth.

2. In a bag closing machine, mechanism for tucking in the neck portion of a bag, mechanism for folding the neck portion of the bag, means for folding down and positioning the folded neck portion of the bag in flatwise position upon the top of the bag, said folded portion carrying a metal tie and arcuate members for folding down and tucking the ends of said tie beneath said folded portions for anchoring the same in position.

3. In a bag closing machine, mechanism for folding the neck of a bag having a metal tie, means for folding down and positioning the folded neck portion upon the top of the bag proper, means for holding the folded portion in position, and means including a pair of arcuate members for folding down and tucking the ends of the metal tie under the folded portion.

4. In a bag closing machine, a pair of cooperating members, one of said members having a guide way for receiving the folded neck portion of a bag carrying a metal tie, the other member having a plate for engaging beneath the folded portion of the bag, and means for relatively moving said members for withdrawing the folded neck portion of the bag from said guide way and positioning the same upon the top of the bag, and a pair of tucking members for crimping the ends of the metal tie beneath said folded portions.

5. In a bag closing machine, the combination with means for folding the neck portions of a bag having a metal tie, of mechanism for positioning the folded neck portion upon a bag and retaining the same in position, a pair of arcuate members for engaging the ends of the metal tie and crimping the same under said folded portion and means for operating said members.

6. In a bag closing machine, a series of devices for acting upon a bag, a conveyor for conveying the bags to said devices, and driving mechanism for said conveyor and devices including a longitudinally movable element, movable in one direction to actuate said devices and movable in the other direction to actuate said conveyor.

7. In a bag closing machine, a series of devices for acting on said bag, a conveyor for moving said bag to said devices, operating mechanism for said devices and conveyor including an element movable in one direction for actuating said devices and movable in a different direction for actuating said conveyor.

8. In a bag closing machine, a conveyor for moving filled bags, and mechanism for alternately engaging the sides of the bag for shaking the same for settling the contents thereof.

9. In a bag closing machine, a conveyor for moving filled bags, a pair of levers upon opposite sides of the conveyor and having plates for engaging the sides of a bag and means for alternately engaging said plates with said bag.

10. In a bag closing machine, mechanism for folding the neck of a bag comprising a rotatable member having grooves, a member for deflecting the upper end of a bag into a groove, means for rotating said member for folding the upper end of the bag, means for lowering said members, and means for again actuating said members for folding the folded portion of the bag.

11. In a bag closing machine, mechanism for folding the neck of a bag comprising a rotatable member having grooves and a swingable member for deflecting a portion of a bag into a groove and means for operating said members in sequence.

12. In a bag closing machine, means for folding the neck portion of a filled bag, mechanism for positioning the folded neck portion in flatwise position upon the top of the filled portion of the bag, said folded neck portion having a metal tie projecting beyond the ends thereof, a pair of arcuate members for engaging the ends of the metal tie and bending the same downwardly and under the folded neck portion and into engagement with portions of the bag for anchoring the folded portion in flatwise position upon said filled portion, and means for actuating said members.

13. In a bag closing machine, means for folding the neck portion of a filled bag, a pair of cooperating members for bending the folded neck portion in flatwise position upon the top of the filled portion of the bag, said folded portion of the bag having a metal tie projecting beyond both ends thereof, a pair of members having arcuate portions for engaging the projecting ends of said tie, and means for actuating said members for bending the ends of said tie downwardly and under the ends of said folded portion and into engagement with portions of the bag for anchoring the folded portion upon the top of the filled bag.

14. In a machine for closing filled bags, means for folding the empty neck portion of the bag, a pair of cooperating members, one of said members having a guideway for receiving the folded neck portion of the bag in upright position, the other member having a laterally extending fulcrum device for engaging the folded neck portion of the bag beneath said guideway, means for relatively moving said members for causing said folded portion to move from said guideway and assume a flatwise position upon the top of the filled bag, one of said members retaining said folded portion in flatwise position upon the top of the filled portion of the bag, said folded portion of the bag having a metal tie projecting beyond the ends thereof, and means for bending the ends of said tie beneath the ends of the folded portion.

15. In a machine for closing a filled bag, means for folding the empty neck portion of the filled bag to form an upright extending folded portion, a pair of cooperating members for engaging opposite sides of said folded portion, means for relatively moving said members for folding said folded portion flatwise upon the top of the filled bag and causing one member to move over and upon said flatwise folded portion for retaining the same in position, said folded portion having a metal tie projecting beyond the ends thereof, a pair of members for engaging and bending the projecting ends of said tie under the ends of said folded portion, and means for actuating said last mentioned members.

16. In a machine for closing a filled bag, mechanism for folding the neck of the bag and positioning the same in flatwise position upon the top of the filled portion, means for retaining said folded portion in such flatwise position, said folded portion having tie means projecting beyond the ends thereof, a pair of members and means for actuating said members for bending down and tucking the ends of said tie means beneath said fold while the same is retained in flatwise position.

17. In a machine for closing filled bags, means for folding the empty neck portion of the bag to provide an upstanding folded portion, said folded portion having tie means projecting beyond the ends thereof, means for bending said folded portion in flatwise position upon the top of the filled bag including a member movable over and upon said flatwise folded portion for retaining the same in position, folders pivoted to said member for engaging the ends of said tie means for folding the same down and under the ends of said folded portion, and means for actuating said folders.

18. In a bag closing machine, means for tucking in and folding the neck portion of a filled bag, means for positioning the folded portion in flatwise position upon the top of the filled portion of the bag including a member movable over the folded portion, said folded portion having tie means projecting beyond the ends of the folded portion, a folder pivoted to each end of said member, and means pivoted to said folders for operating the same and causing the same to engage the ends of said tie for folding the same downwardly and under the folded portion of the bag.

19. In a bag closing machine, a series of devices for acting upon the neck portions of filled bags to fold and secure the same, a conveyor for intermittently feeding the bags to said devices and operating mechanism for said devices and conveyor including an element movable in one direction for actuating said devices and movable in a different direction for actuating said conveyor, and means for controlling the operation of said mechanism.

20. In a machine for closing filled bags, a series of devices for acting upon the empty neck portions of the bags, a conveyor for successively feeding bags to said devices, operating means for alternately actuating said devices and conveyor including a rack bar movable in one direction for actuating said devices and movable in the opposite direction for actuating said conveyor, and means for reciprocating said rack bar.

21. In a machine for closing filled bags, a conveyor for conveying filled bags, means for intermittently operating said conveyor and causing the same to pause with a filled bag in a predetermined position, and means for settling the contents of said bag in said predetermined position comprising vibrating elements, and means for actuating said elements for causing the same to alternately engage opposite portions of the bag for shaking the same and settling the contents thereof.

22. In a machine for closing filled bags, mechanism for tucking inwardly the ends of the neck of the bags comprising a movable device, a pair of tucking members pivoted intermediate their ends to said device, means for raising and lowering said device, said members having angular portions extending vertically above said device, a link connected to each angular portion, slotted rods connected to said links, and stationary pins extending through the slots in said rods.

23. In a machine for closing filled bags, mechanism for tucking inwardly the ends of the necks of the bags comprising a cross head, means for raising and lowering said cross head, a pair of tucking members pivoted intermediate their ends to said cross head, one at each end of said cross head, said members having angular portions extending vertically above said cross head, a short link pivoted to each angular portion, a slotted vertical rod pivoted to each link, and stationary pins extending through the slots of said rods.

24. In a bag closing machine, a conveyor for carrying filled bags, mechanism for folding the neck portion of the bag and securing the folded portion to the bag, means for alternately operating said conveyor, and mechanism including a member movable in one direction for operating said conveyor and movable in a different direction for operating said mechanism, and an element automatically disconnectable after the operation of said conveyor.

CHARLES F. ALLISON.